United States Patent [19]
Wohltjen

[11] Patent Number: 5,474,026
[45] Date of Patent: Dec. 12, 1995

[54] COMBINATION CAT SCRATCHING CURTAIN AND RESTING AREA

[76] Inventor: Nancy J. Wohltjen, P.O. Box 212, Rumford, Me. 04276

[21] Appl. No.: 304,887

[22] Filed: Sep. 13, 1994

[51] Int. Cl.$^6$ ..................................................... A01K 29/00
[52] U.S. Cl. .......................................... 119/28.5; 119/706
[58] Field of Search .................................. 119/28.5, 706, 119/702, 705, 707, 710, 711, 712

[56] References Cited

U.S. PATENT DOCUMENTS

| | | | |
|---|---|---|---|
| 2,827,116 | 3/1958 | Zalovcik | 119/705 |
| 3,916,838 | 11/1975 | Swart | 119/712 X |
| 4,790,265 | 12/1988 | Manson | 119/706 |
| 5,038,716 | 8/1991 | Olson | 119/706 |
| 5,113,795 | 5/1992 | Delzio | 119/706 X |

Primary Examiner—Thomas Price

[57] ABSTRACT

A combination cat scratching curtain and resting area comprising a support having a vertical plate with apertures adapted to be mounted on a vertical recipient surface, the support having a horizontal plate having an interior edge secured with respect to the upper edge of the vertical plate with vertical screws for attaching the horizontal plate to the vertical plate, lateral plates secured to the side edges of the vertical plate and horizontal plates with aligned circular apertures extending therethrough; and a dowel having a circular cross-section and of a length greater than the width of the vertical plate positionable through the apertures of the lateral plates, the dowel being provided with trapezoidal recesses with trapezoidal wedges positionable therethrough adjacent the exterior surfaces of the lateral plates to retain the dowel centrally positioned with respect to the lateral plates.

4 Claims, 4 Drawing Sheets

COMBINATION CAT SCRATCHING CURTAIN AND RESTING AREA

BACKGROUND OF THE INVENTION

1. Field of the Invention

The present invention relates to a combination cat scratching curtain and resting area and more particularly pertains to providing an area for a cat to possess having a generally horizontal surface for scratching and playing.

2. Description of the Prior Art

The use of scratching posts and pet beds is known in the prior art. More specifically, scratching posts and pet beds heretofore devised and utilized for the purpose of providing resting and play areas for cats are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,790,265 to Manson a cat scratching post and exercise center.

U.S. Pat. No. 4,253,423 to Kaplan discloses a cat scratching and climbing post.

U.S. Pat. No. 4,112,873 to Van Zandt discloses an animal climbing structure kit.

U.S. Pat. No. 3,604,397 to Salerno discloses a cat perch and exercise pole.

U.S. Pat. No. 3,479,991 to Lichtenberger discloses an animal climbing structure.

In this respect, the combination cat scratching curtain and resting area according to the present invention substantially departs from the conventional concepts and designs of the prior art, and in so doing provides an apparatus primarily developed for the purpose of providing an area for a cat to possess having a generally horizontal surface for scratching and playing.

Therefore, it can be appreciated that there exists a continuing need for a new and improved combination cat scratching curtain and resting area which can be used to provide an area for a cat to possess having a generally horizontal surface for resting and a curtain for scratching and playing. In this regard, the present invention substantially fulfills this need.

SUMMARY OF THE INVENTION

In view of the foregoing disadvantages inherent in the known types of scratching posts and pet beds now present in the prior art, the present invention provides an improved combination cat scratching curtain and resting area. As such, the general purpose of the present invention, which will be described subsequently in greater detail, is to provide a new and improved combination cat scratching curtain and resting area apparatus and method which has all the advantages of the prior art and none of the disadvantages.

To attain this, the present invention essentially comprises a new and improved combination cat scratching curtain and resting area comprising, in combination, a support, the support having a vertical plate with apertures adapted to be mounted on a vertical recipient surface, the support having a horizontal plate having an interior edge secured with respect to the upper edge of the vertical plate with vertical screws for attaching the horizontal plate to the vertical plate, lateral plates secured to the side edges of the vertical plate and horizontal plates with aligned circular apertures extending therethrough; a dowel having a circular cross-section and of a length greater than the width of the vertical plate positionable through the apertures of the lateral plates, the dowel being provided with trapezoidal recesses with trapezoidal wedges positionable therethrough adjacent the exterior surfaces of the lateral plates to retain the dowel centrally positioned with respect to the lateral plates; a curtain having an upper hem adapted to be received by the dowel for suspension therefrom, the curtain having a hem at its lower end with catnip located therewithin; and padding over the upper horizontal surface of the horizontal plate, the padding having a planar lower surface and an arcuate upper surface, the padding being formed of a closed cell polyurethane foam, and a cloth cover extending over the padding, the front, rear and side edges of the horizontal plate with means for removably attaching the cover with respect thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combination cat scratching curtain and resting area which has all the advantages of the prior art scratching posts and pet beds and none of the disadvantages.

It is another object of the present invention to provide a new and improved combination cat scratching curtain and resting area which may be easily and efficiently manufactured and marketed.

It is a further object of the present invention to provide a new and improved combination cat scratching curtain and resting area which is of a durable and reliable construction.

An even further object of the present invention is to provide a new and improved combination cat scratching curtain and resting area which is susceptible of a low cost of manufacture with regard to both materials and labor, and which accordingly is then susceptible of low prices of sale to the consuming public, thereby making such scratching posts and pet beds economically available to the buying public.

Still yet another object of the present invention is to provide a new and improved combination cat scratching curtain and resting area which provides in the apparatuses and methods of the prior art some of the advantages thereof, while simultaneously overcoming some of the disadvantages normally associated therewith.

Still another object of the present invention is to provide an area for a cat to possess having a generally horizontal surface for scratching and playing.

Lastly, it is an object of the present invention to provide a new and improved combination cat scratching curtain and resting area comprising a support having a vertical plate with apertures adapted to be mounted on a vertical recipient surface, the support having a horizontal plate having an interior edge secured with respect to the upper edge of the vertical plate with vertical screws for attaching the horizontal plate to the vertical plate, lateral plates secured to the side edges of the vertical plate and horizontal plates with aligned circular apertures extending therethrough; and a dowel having a circular cross-section and of a length greater than the width of the vertical plate positionable through the apertures of the lateral plates, the dowel being provided with trapezoidal recesses with trapezoidal wedges positionable therethrough adjacent the exterior surfaces of the lateral plates to retain the dowel centrally positioned with respect to the lateral plates.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
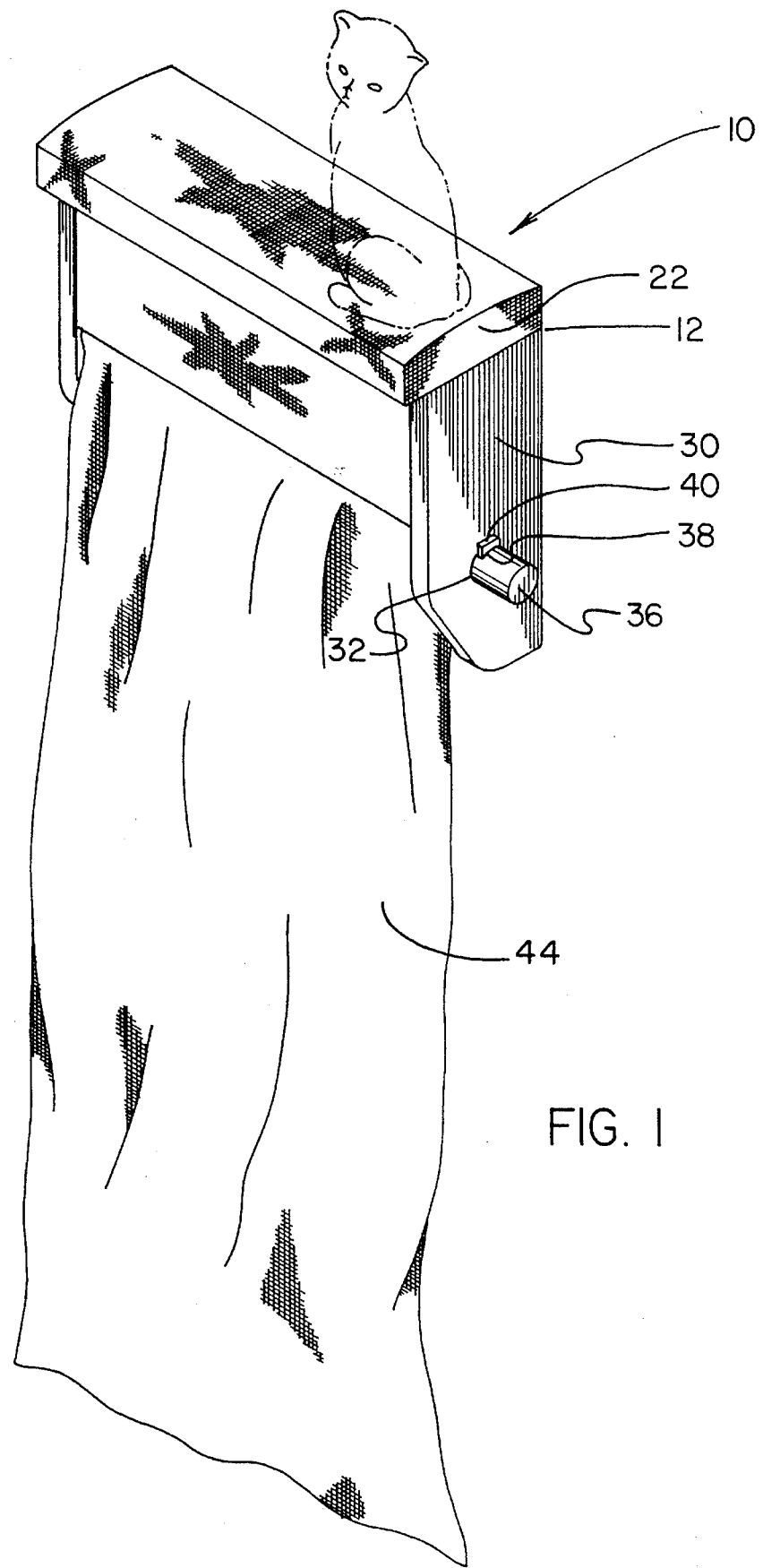
FIG. 1 is a perspective illustration of the preferred embodiment of the new and improved combination cat scratching curtain and resting area constructed in accordance with the principals of the present invention.
Figure 2:
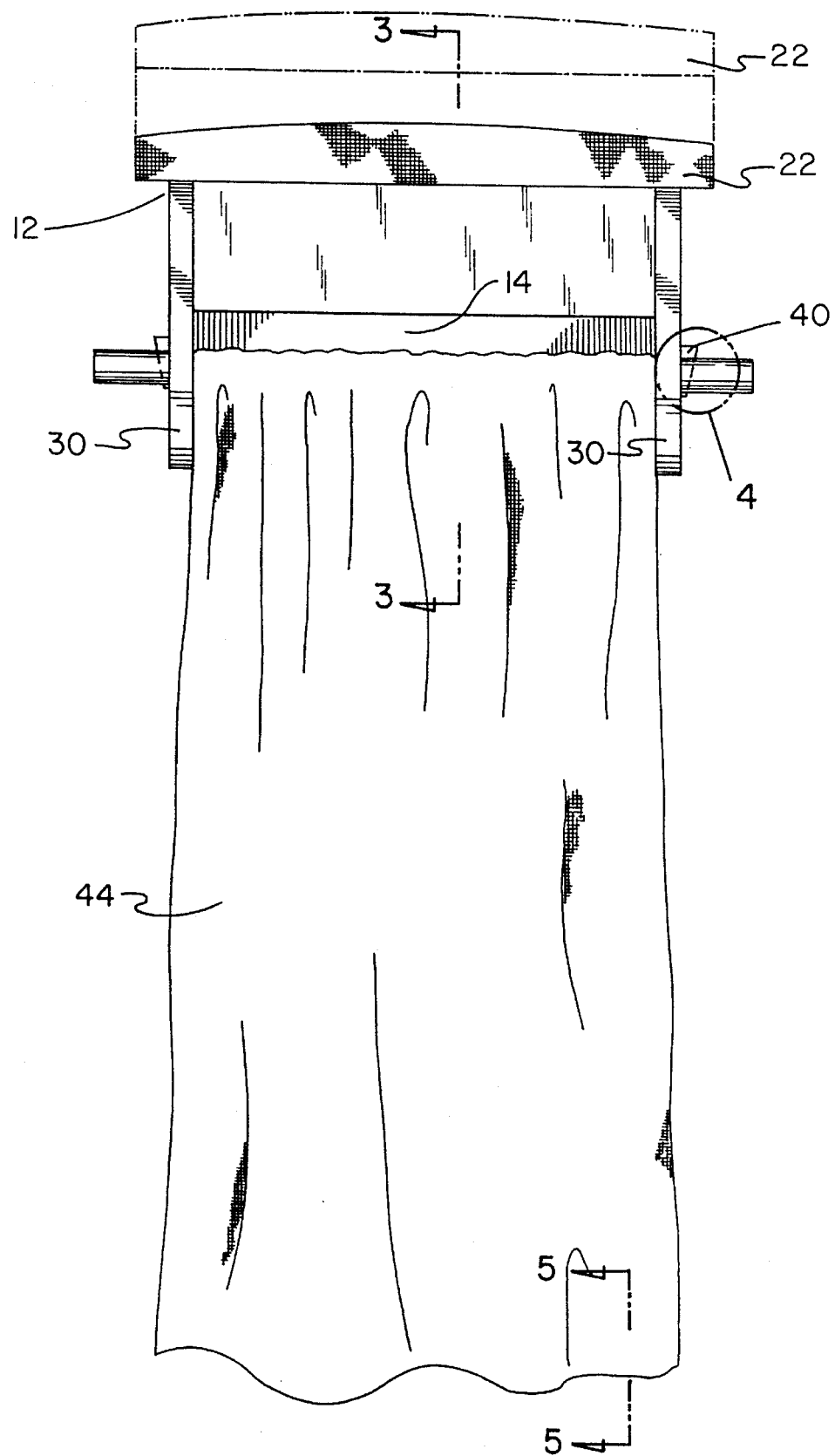
FIG. 2 is a front elevational view of the device shown in FIG. 1.
Figure 3:
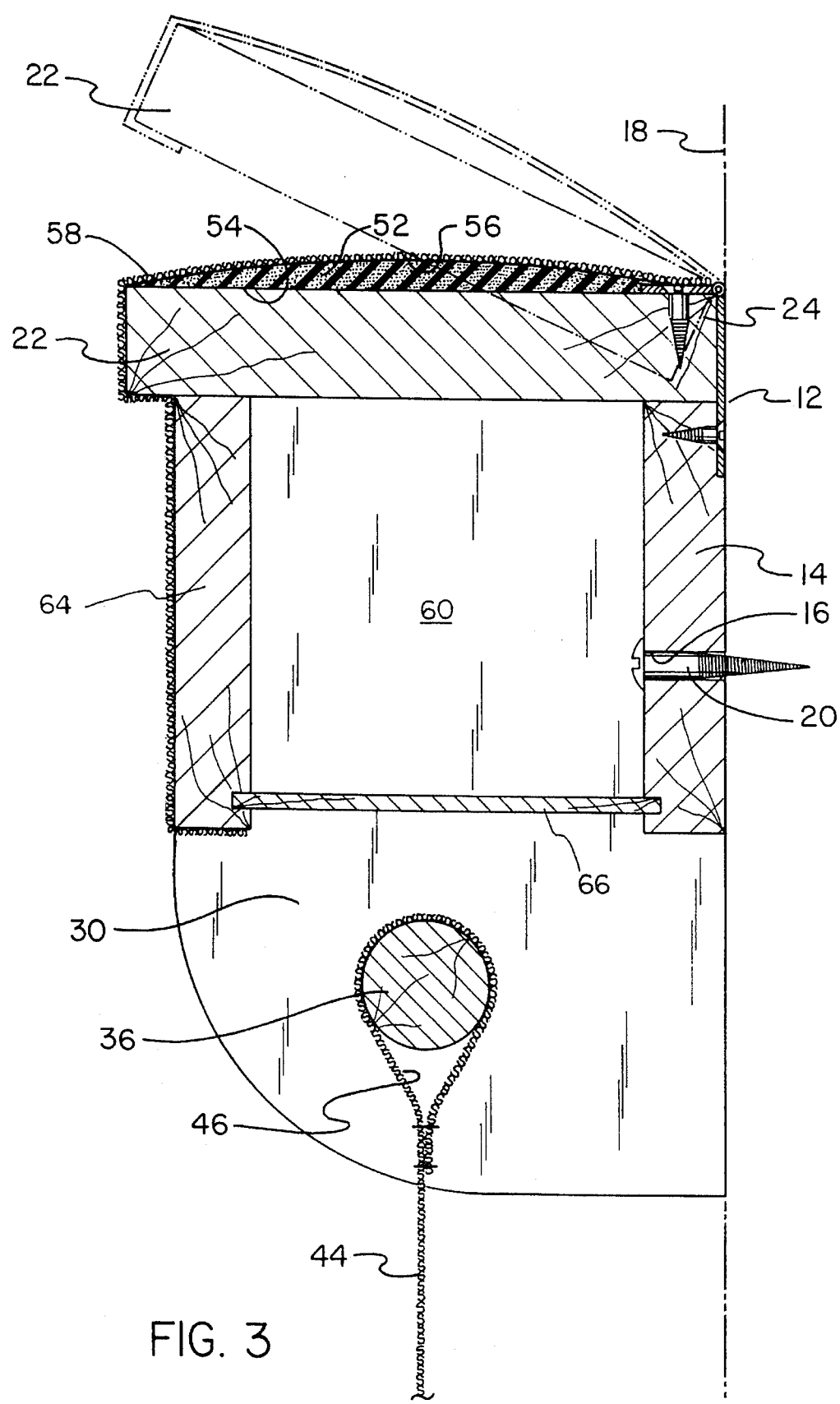
FIG. 3 is a cross-sectional view taken along line 3—3 of FIG. 2.
Figure 4:
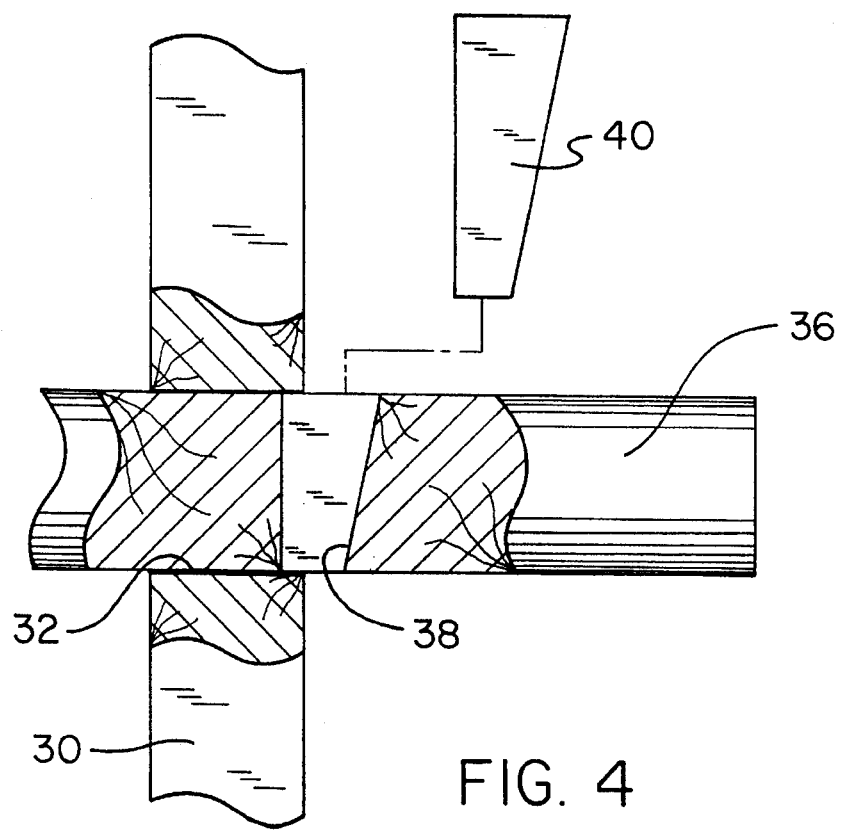
FIG. 4 is an enlarged front elevational view of that portion of the device noted by circle 4 in FIG. 2, parts being shown in cross-section to illustrate certain internal constructions thereof.
Figure 5:
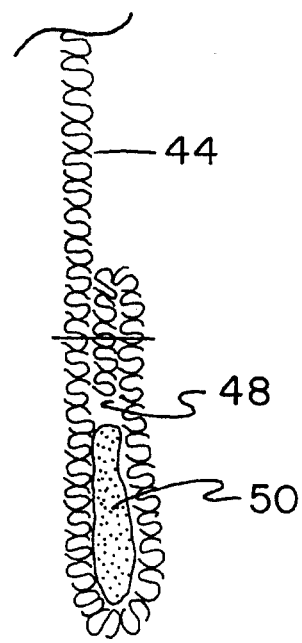
FIG. 5 is a cross-sectional view of the device of the prior figures taken along line 5—5 of FIG. 2.

With reference now to the drawings, and in particular to FIG. 1 thereof, a new and improved combination cat scratching curtain and resting area embodying the principles and concepts of the present invention and generally designated by the reference numeral 10 will be described.

Specifically, the present invention is comprised of a plurality of component elements. Such component elements, in their broadest context, include a support, a dowel, a towel and padding. Such components are specifically configured and correlated with respect to each other so as to attain the desired objectives.

More specifically, the system includes a support 12. The support has a vertical plate 14. Such vertical plate has apertures 16 whereby the vertical plate and support are adapted to be mounted as by screws 20 onto a vertical recipient surface such as a wall 18.

The support also has a horizontal plate 22 with an interior edge 24 secured with respect to the upper vertical edge 25 of the vertical plate. Also provided are horizontal screws 20 for attachment of the vertical plate and support to the wall. The vertical screws 28 are also provided for attaching the horizontal plate to the vertical plate. The support also includes vertically disposed lateral plates 30 spaced from each other and secured to the side edges 31 of both the vertical and horizontal plates. Aligned circular apertures 32 extend through the lateral plates and are in axial alignment with each other.

The next component of the system 10 is a dowel 36. The dowel has a circular cross-section. It is a length greater than the width of the vertical plate and is positioned through the apertures of the spaced lateral plates. The dowel is provided with trapezoidal recesses 38. In addition, trapezoidal wedges 40 are positionable in the recesses therethrough at locations adjacent to the exterior surfaces 39 of the lateral plates. The wedges function to retain the dowel centrally positioned with respect to the lateral plates.

The next element of the system 10 is a towel 44. The towel has an upper hem 46. Such hem is adapted to be received by the dowel for suspension therefrom. The towel also has a hem 48 at its lower end. Within the hem of the lower end is catnip 51 for attracting a cat and irking the cat to play with the towel.

The next component of the system 10 is padding 52. The padding is located over the upper horizontal surface of the horizontal plate. Such padding has a planar lower surface 54 and an arcuately shaped upper surface 56. The padding is formed of a resilient material, preferably a closed cell polyurethane foam. The padding is held in position by a cloth cover 58. The cloth cover extends over the padding as well as over the front, rear and side edges of the horizontal plate. Glue 59 is utilized for attaching the cover to the horizontal plate while allowing for removal thereof for cleaning purposes.

Lastly, added utility is provided to the present invention by the inclusion of a box 60 beneath the horizontal plate 22. A front plate 64 and floor 66 are added to the vertical plate 14 and lateral plates 30 to define the space of the box. A hinge 68 couples the top horizontal plate 22 to the vertical plate 14 to allow access to the space of the box which will allow storage of a wide variety of items including flea powder, leash, cat toys, cat brush, etc.

For most people, pets are more than just decorations for the home or yard. They're part of the family deserving of hugs, attention, and love. Animals possess widely varying emotions and feelings, just like their human companions. This seems particularly true of cats. They can be the most docile creatures when the mood suits them, but they can also lash out, slashing furniture when their instincts and aggressive nature push them to their more wild side. Carpeting, drapes, sofas, bedspreads, and other cloth-like surfaces are favorites of cats for testing and sharpening their claws. Clearly, what is needed is a dedicated area for cats to exercise their claws, rather than using expensive furniture for this purpose. The present invention is a length of curtain material with a sleeping shelf located on the top.

The present invention is constructed from a section of burlap curtain, a wooden dowel, and includes a wooden shelf. The dowel is suspended below the shelf, between its two sides. The burlap curtain measures 36 inches high by 22 inches wide and is hung on the dowel much like an ordinary curtain. Most cats should immediately recognize this as the ideal scratching and sleeping center, and will likely spend a great deal of time on it. The durable materials used in the construction of the present invention are well suited to the application and are of the highest quality. Cats possess a keen intellect and might not like an inferior product. Even so, if a cat refuses to use the present invention the bottom of the hem on the curtain can be filled with fresh catnip.

In addition to having to endure cat hair in one's food and paw prints on one's new automobile, cat owners must also endure the responsibility of securing their possessions from damage. The present invention provides a cat with a place for scratching and exercising their claws while helping to preserve the value of their owner's belongings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved combination cat scratching curtain and resting area comprising, in combination:
    a support, the support having a vertical plate with apertures, said support adapted to be mounted on a vertical recipient surface, the support having a horizontal plate having an interior edge secured with respect to an upper edge of the vertical plate with vertical screws attaching the horizontal plate to the vertical plate, lateral plates secured to side edges of the vertical plate and horizontal plates with aligned circular apertures extending therethrough;
    a dowel having a circular cross-section and of a length greater than the width of the vertical plate positioned through the apertures of the lateral plates, the dowel being provided with trapezoidal recesses with trapezoidal wedges positioned therethrough adjacent the exterior surfaces of the lateral plates to retain the dowel centrally positioned with respect to the lateral plates;
    a curtain having an upper hem received by the dowel and suspending therefrom, the curtain having a hem at its lower end with catnip located therewithin; and
    padding over an upper horizontal surface of the horizontal plate, the padding having a planar lower surface and an arcuate upper surface, the padding being formed of a closed cell polyurethane foam, and a cloth cover extending over the padding, and means removably attaching the cover to said horizontal plate.

2. A combination cat scratching curtain and resting area comprising:
    a support having a vertical plate with apertures, said support adapted to be mounted on a vertical recipient surface, the support having a horizontal plate having an interior edge secured with respect to an upper edge of the vertical plate with vertical screws attaching the horizontal plate to the vertical plate, lateral plates secured to side edges of the vertical plate and horizontal plates with aligned circular apertures extending therethrough;
    a dowel having a circular cross-section and of a length greater than the width of the vertical plate positioned through the apertures of the lateral plates, the dowel being provided with trapezoidal recesses with trapezoideal wedges positioned therethrough adjacent the exterior surfaces of the lateral plates to retain the dowel centrally positioned with respect to the lateral plates;
    and a curtain having an upper hem received by the dowel and suspending therefrom, the curtain having a hem at a lower end with catnip located therewithin.

3. The combination as set forth in claim 2 and further including:
    padding over an upper horizontal surface of the horizontal plate, the padding having a planar lower surface and an arcuate upper surface, the padding being formed of a resilient material, the padding also including a cloth cover extending over the padding, and means removably attaching the cover to said horizontal plate.

4. The device as set forth is claim 2 and further including:
    a hinge coupling the horizontal plate to the vertical plate with a box therebeneath.

* * * * *